(12) United States Patent
Spencer

(10) Patent No.: US 7,028,428 B1
(45) Date of Patent: Apr. 18, 2006

(54) SELF-BALANCING HUNTING DECOY

(76) Inventor: Lawrence E. Spencer, 116 S. Paul Dr., Sibley, MO (US) 64088

( * ) Notice: Subject to any disclaimer, the term of this patent is extended or adjusted under 35 U.S.C. 154(b) by 0 days.

(21) Appl. No.: 10/997,601

(22) Filed: Nov. 23, 2004

(51) Int. Cl.
*A01M 31/06* (2006.01)
*A63H 13/18* (2006.01)
*A63H 15/06* (2006.01)
*A63H 15/08* (2006.01)

(52) U.S. Cl. ............................. 43/2; 446/325; 446/396
(58) Field of Classification Search .................. 43/2, 43/3; 446/325, 326, 396
See application file for complete search history.

(56) References Cited

U.S. PATENT DOCUMENTS

| | | | | |
|---|---|---|---|---|
| 93,293 A * | 8/1869 | Foster | | 43/3 |
| 430,565 A * | 6/1890 | Curlin | | 43/3 |
| 512,810 A * | 1/1894 | Curlin | | 43/3 |
| 559,536 A * | 5/1896 | Nesbit | | 446/325 |
| 747,732 A * | 12/1903 | Kremer | | 43/3 |
| 836,823 A * | 11/1906 | Oliver et al. | | 43/3 |
| 1,306,655 A * | 6/1919 | Bacho | | 43/3 |
| 1,392,065 A * | 9/1921 | Klock | | 43/3 |
| 1,394,669 A * | 10/1921 | Da Costa | | 446/326 |
| 1,518,108 A * | 12/1924 | Rapp | | 446/325 |
| 1,538,704 A * | 5/1925 | Kay | | 446/325 |
| 1,566,858 A * | 12/1925 | Guinzburg | | 43/3 |
| 1,604,614 A * | 10/1926 | Stoner | | 43/3 |
| 1,604,615 A * | 10/1926 | Stoner | | 43/3 |
| 1,630,137 A * | 5/1927 | Ruwwe | | 446/325 |
| 1,659,248 A * | 2/1928 | Eldon | | 43/3 |
| 1,668,785 A * | 5/1928 | Smart | | 43/3 |
| 1,673,479 A * | 6/1928 | Allen | | 43/3 |
| 1,714,558 A * | 5/1929 | Hauff | | 43/3 |
| 1,806,456 A * | 5/1931 | Haigler | | 43/3 |
| 2,032,192 A * | 2/1936 | Wheeler, Jr. | | 43/3 |
| 2,339,983 A * | 1/1944 | Day | | 43/3 |
| 2,483,680 A * | 10/1949 | Timm et al. | | 43/3 |
| 2,495,721 A * | 1/1950 | Heymann | | 43/3 |
| 2,546,189 A * | 3/1951 | Keep et al. | | 43/3 |
| 2,564,890 A * | 8/1951 | Fox | | 43/3 |
| 2,577,343 A * | 12/1951 | Martin | | 446/325 |
| 2,611,997 A * | 9/1952 | Solloway et al. | | 446/325 |
| 2,650,453 A * | 9/1953 | Martin | | 43/3 |
| 2,748,519 A * | 6/1956 | Dennison et al. | | 43/3 |
| 2,771,700 A * | 11/1956 | Renwick, Jr. | | 43/3 |
| 2,937,872 A * | 5/1960 | Gilman | | 446/396 |
| 2,939,707 A * | 6/1960 | Lemelson | | 273/402 |
| 3,047,972 A * | 8/1962 | Taylor | | 43/3 |
| 3,163,419 A * | 12/1964 | Lemelson | | 446/325 |
| 3,226,880 A * | 1/1966 | Novello | | 446/325 |
| 3,254,439 A * | 6/1966 | Hansen | | 43/3 |
| 3,436,856 A * | 4/1969 | Miller | | 43/3 |
| 3,460,283 A * | 8/1969 | Stephens | | 43/3 |
| 3,704,538 A * | 12/1972 | Gagnon | | 43/3 |
| 3,896,578 A * | 7/1975 | Franceschini | | 43/3 |
| 3,921,331 A * | 11/1975 | Schatz | | 446/325 |

(Continued)

FOREIGN PATENT DOCUMENTS

FR           2215798 A * 9/1974

(Continued)

Primary Examiner—Darren W. Ark
(74) Attorney, Agent, or Firm—Invention Protection Associates, LLC

(57) ABSTRACT

A self-balancing hunting decoy comprised of two vertically attached portions is disclosed. The upper portion depicts the body and appendages of a prey animal. Underneath the upper portion is a lower portion that is a semispherical shell containing a ballast. The decoy sits upright while freestanding on the ground.

3 Claims, 4 Drawing Sheets

U.S. PATENT DOCUMENTS

| | | | |
|---|---|---|---|
| 4,339,887 A * | 7/1982 | Streeter | 43/2 |
| 4,471,565 A * | 9/1984 | Terzian et al. | 446/325 |
| 4,582,498 A * | 4/1986 | Tamada | 446/325 |
| 4,655,722 A * | 4/1987 | Baron et al. | 446/325 |
| 4,770,412 A * | 9/1988 | Wolfe | 446/325 |
| 4,773,178 A * | 9/1988 | Marek | 43/2 |
| 4,787,875 A * | 11/1988 | Baron et al. | 446/325 |
| 4,821,444 A * | 4/1989 | Remus | 43/2 |
| 4,822,044 A * | 4/1989 | Perkitny | 446/396 |
| 4,931,029 A * | 6/1990 | Hwang | 446/396 |
| 5,100,360 A * | 3/1992 | Entzel | 446/396 |
| 5,168,649 A * | 12/1992 | Wright | 43/2 |
| 5,172,507 A * | 12/1992 | Franceschini | 43/3 |
| 5,207,757 A * | 5/1993 | Franceschini | 43/3 |
| 5,274,942 A * | 1/1994 | Lanius | 43/2 |
| 5,322,036 A * | 6/1994 | Merino | 446/325 |
| 5,515,637 A * | 5/1996 | Johnson | 43/2 |
| 5,806,768 A * | 9/1998 | Engel | 446/325 |
| 5,832,650 A * | 11/1998 | Franceschini | 43/3 |
| 5,961,426 A * | 10/1999 | Spector | 446/396 |
| 6,070,356 A * | 6/2000 | Brint et al. | 43/2 |
| 6,165,041 A * | 12/2000 | Lin | 446/325 |
| 6,173,678 B1 * | 1/2001 | Bambauer et al. | 446/325 |
| 6,217,408 B1 * | 4/2001 | Willinger | 446/396 |
| 6,519,891 B1 * | 2/2003 | Fulcher | 43/2 |
| 6,530,815 B1 * | 3/2003 | Bro et al. | 446/325 |
| 6,532,693 B1 * | 3/2003 | Sides | 43/2 |
| 6,658,782 B1 * | 12/2003 | Brint | 43/2 |
| 6,877,267 B1 * | 4/2005 | Burton | 43/2 |
| 2002/0100205 A1 * | 8/2002 | Burton | 43/2 |
| 2004/0010957 A1 * | 1/2004 | Corbiere | 43/3 |
| 2004/0198159 A1 * | 10/2004 | Xu et al. | 446/325 |
| 2005/0112992 A1 * | 5/2005 | Malcolm | 446/325 |

FOREIGN PATENT DOCUMENTS

| | | | |
|---|---|---|---|
| GB | 1385023 A | * | 2/1975 |
| GB | 2230171 A | * | 10/1990 |

* cited by examiner

SELF-BALANCING HUNTING DECOY

BACKGROUND OF THE INVENTION

1. Field of the Invention

The present invention generally relates to hunting gear, and specifically relates to a hunting decoy that is self-balancing while freestanding, replicates a prey animal and is used to attract live prey to its vicinity, so, a closely stationed hunter may shoot the prey with a firearm.

2. Description of Prior Art

Decoys have long been used in the sport of hunting. When used in conjunction with call devices that simulate vocal sounds normally made by prey animals such as turkeys and pheasants, decoys are particularly useful in luring live prey near both them and awaiting hunters. Many conventional decoys have bodies and appendages comprised of rigid material, such as hard plastic, that are molded and decorated to simulate a particular animal species. However, while many such decoys might bear indistinguishable resemblances to real prey, the size of a typical rigid bodied, non-collapsible turkey decoy, for example, makes it inconvenient for a hunter to carry while walking throughout the hunting area in quest of a suitable location to set the decoy for use. For obvious reasons, a non-collapsible decoy may not lend itself to being stashed inside the hunter's clothes pocket, backpack, knapsack or other carrying accessory. The inconvenience is compounded by the hunter's need to haul multiple of these non-collapsible decoys. Therefore, it is generally true that rigid bodied, non-collapsible decoys are burdensome for the hunter to transport while hunting.

Further, in order to mount them on the ground in an upright and life-like posture, many conventional land animal decoys have stakes extending downward from their bodies where legs would normally be attached. These stakes must be driven into the soil in order to anchor these decoys in the upright position on the ground. U.S. Pat. No. D437,382 to Krise et al. shows a design for a inflatable turkey decoy that, ostensibly, must be staked to the ground in similar fashion.

Others land animal decoys have bodies mounted on supporting platforms designed to rest on top of the ground. U.S. Pat. No. 6,684,552 to Anders, III discloses a turkey decoy mounted on a stand, of sorts, that is to be gently placed on the ground's surface. U.S. Pat. No. 6,708,440 to Summers et al. discloses a decoy having a body mounted on a carriage for movement along the ground.

Regardless of the particular mechanisms employed for setting previous land decoys in desired postures on the ground, a hunter using one of these decoys must follow nearly the same routine in all cases. First, he must either manually place the decoy upright on top of the ground or stake the decoy to the ground in a proper posture at a spot in the hunting area that is within shooting range of the place at which he will wait for prey to arrive. Then, he must walk away from the set decoy to his waiting place. Once there, he must minimize his body movements and otherwise camouflage himself; approaching prey will tend to flee the scene upon detecting human presence. Therefore, when live prey does enter the hunter's vicinity, he likely will have little or no opportunity to walk back to his decoy in order to reposition it such that the decoy is more prone to be noticed by and attract an unsuspecting prey animal and make the prey an easier shooting target.

Furthermore, a hunter, often, will walk within the vicinity of his prey without noticing the prey until the last moment. In those instances, it would be beneficial to the hunter if he could simply toss a decoy away from himself to the ground and then remain still, rather than having to carefully sit the decoy upon the ground or stake the decoy into the ground and then retreat from it.

Accordingly, it can be appreciated that there exists a need for a hunting decoy that can assume and maintain an upright and balanced posture on the ground, without careful manual manipulation, even after being projected airborne. It also can be appreciated that there exists a further need for such a decoy to be inflatable and collapsible for efficient transporting. The present invention substantially fulfills these needs.

The present invention is drawn to a hunting decoy that a hunter can toss or drop, from either ground level or an elevated hunting position, to a spot on the ground and does not further require the hunter to manually rest, anchor or otherwise prop the decoy into a posture simulating that of a live prey animal. The applicant is unaware of any prior invention for a self-balancing hunting decoy that is comprised of an air inflatable upper portion shaped in the form of a prey animal's head and body (e.g., turkey, pheasant, quail, etc.) and a semispherical lower portion, removably adjoined by hook and loop fastener material, that holds a ballasting agent, such as a ball bearing(s), water or sand, as is disclosed in the present invention.

SUMMARY OF THE INVENTION

In view of disadvantages inherent in the known hunting decoys of the prior art, a novel hunting decoy is disclosed. The purpose of the present invention is to provide a hunting decoy with a self-balancing mechanism that allows the freestanding decoy to find and maintain a life-simulating, upright posture relative to the ground upon which the decoy sits.

The present invention is comprised of two distinct, but adjoined, portions. One such portion, the upper portion, is inflatable and collapsible and when fully inflated, assumes the size and shape of the simulated prey.

The upper portion has the following three primary characteristics: (1) an outer surfaces imprinted and/or otherwise decorated to resemble the particular species of game animal that the decoy is intended to simulate; (2) hook and loop fastener material along a flattened bottom surfaces for permanent or removable attachment to a semispherical lower portion; and (3) body weights (including the weight of air within the inflatable embodiment) that are substantially less than the aggregate weight of the lower portion and its ballasting agent, both of which are discussed below.

Attached underneath the upper portion is a separate lower portion. This lower portion comprises a hollow, fully enclosed half sphere constructed of a rigid and durable material and features a patch of hook and loop fastener material on its top surface. Thus, the two bodies are adjoined along the flat bottom of the upper portion and the flat circular top of lower portion.

In an embodiment of the present invention, the upper and lower portions are permanently adjoined. In an alternative embodiment, they are removably attached by way of a temporary fastening means.

Contained within the lower portion is a ballasting agent. In one embodiment of the invention, the ballasting agent is a liquid fluid or granular fluid material. In another embodiment, the ballasting agent comprises one or more solid spherical objects. Nevertheless, in all cases, the lower portion and ballasting agent, together, weigh appreciably more than the upper portion.

These and other objects of the present invention will become apparent upon review of the following description and drawings.

DETAILED DESCRIPTION OF THE PREFERRED EMBODIMENTS

Figure 1:
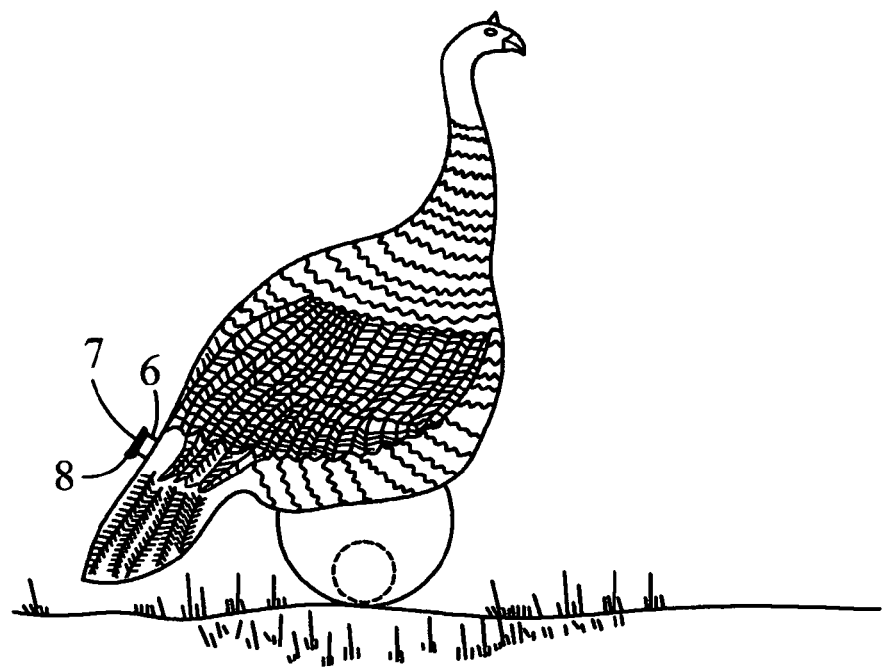
FIG. 1 is a side elevation view of the decoy of the present invention in the fully inflated state.
Figure 2:
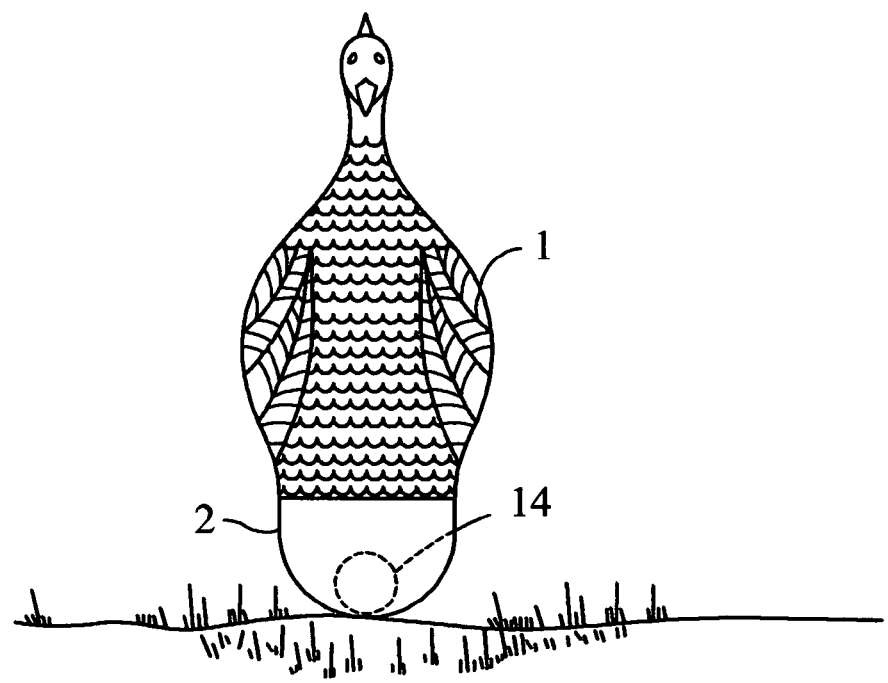
FIG. 2 is a front elevation view of the decoy.
Figure 3:
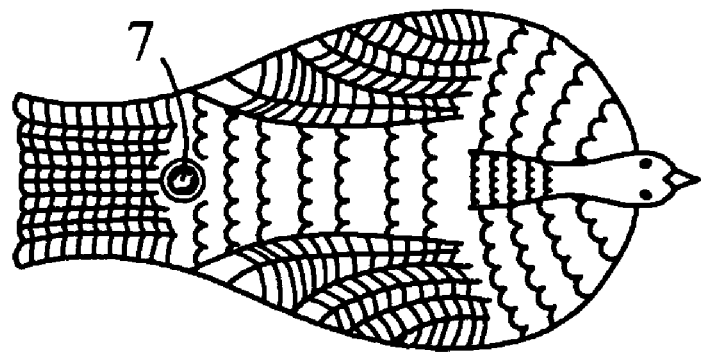
FIG. 3 is a top plan view of the decoy.
Figure 4:
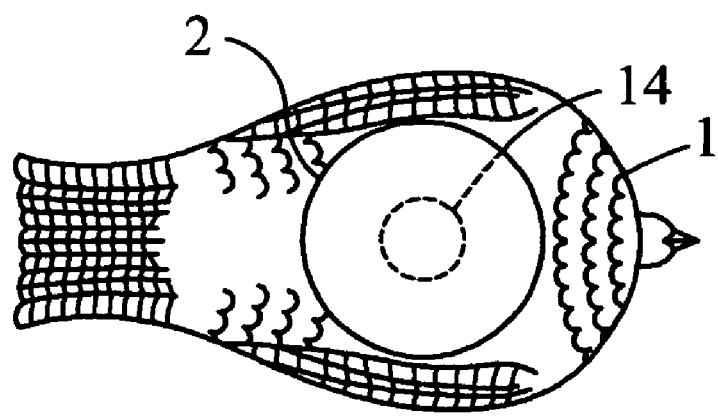
FIG. 4 is a bottom plan view of the decoy.
Figure 5:
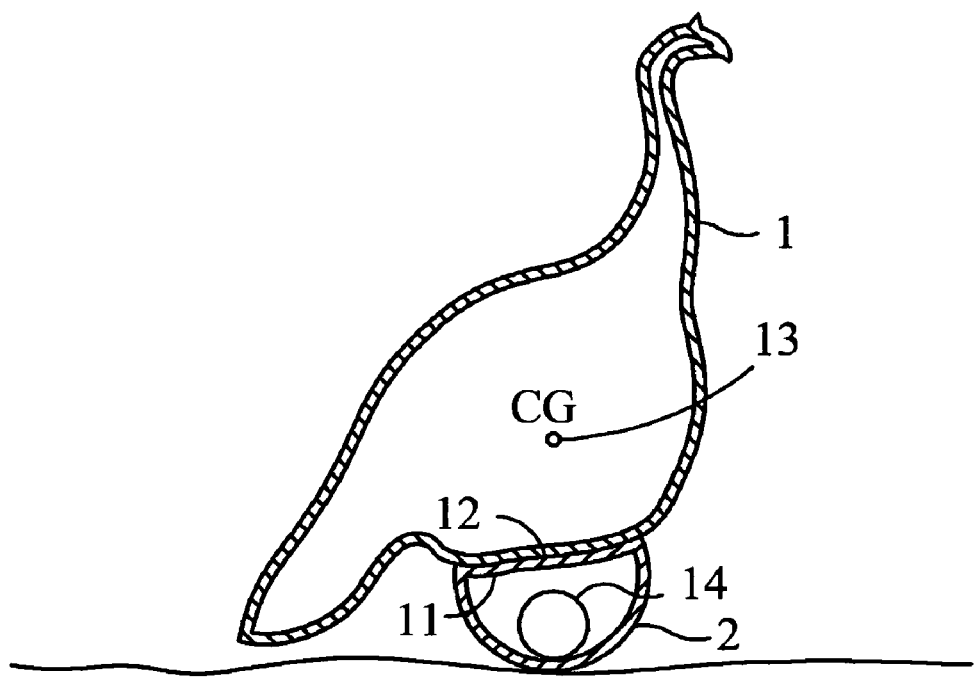
FIG. 5 is a side sectional view of the decoy.

FIG. 1 shows the decoy of the present invention. More specifically, it illustrates an upper portion 1 and an adjoined lower portion 2. In this particular drawing, upper portion 1 depicts the head, neck and body of a turkey. However, upper portion 1, alternatively, may depict the bodies and appendages of various other species of game animals.

Upper portion 1 is an inflatable, hollow compartment constructed of a thin, flexible, durable, air-impermeable material such as a soft plastic or vinyl. Positioned virtually anywhere along this compartment is an inflation tube 6 and an attached tube cap 7, similar to those ordinarily found on an inflatable beach ball, for example. Tube cap 7 is attached to tube 6 by way of a short strap 8. Tube cap 7 is substantially conical and sized to plug the inner cylinder of tube 6. Along the bottom surface of upper portion 1 is a circular patch of hook and loop fastener material 9.

A hunter may inflate upper portion 1 by taking the three successive steps of: (1) dislodging tube cap 7 from inflation tube 6; (2) orally injecting air into upper portion 1 via inflation tube 6; and (3) immediately thereafter lodging tube cap 7 into tube 6 to trap the injected air therein. When fully inflated as shown FIG. 1, upper portion 1 expands into the size and shape of the simulated prey animal. Also, as can be understood from FIGS. 1–4, the outer surface of upper portion 1 is imprinted with lines, shading, colors and other superficial features of the intended prey. Conversely, when fully deflated, upper portion 1 will contract and may be crumpled and compressed into a small mass of unrecognizable form such that the entire decoy becomes compact enough to be stuffed into a large pocket or other container for carrying throughout the hunting area.

In another embodiment depicted in FIGS. 3–6, upper portion 1 is a hollow shell constructed of a thin, rigid material such as a hard plastic. This embodiment, of course, does not include inflation means. In yet another embodiment, upper portion 1 is a solid body made of a lightweight material such as foam.

Lower portion 2 is a semispherical, fully enclosed shell fabricated of rigid material, such as hard plastic, hard rubber or various metals. Its flat circular top 11 features a concentric circular patch of hook and loop fastener material 16 for engagement with the fastener patch 9 underneath the upper portion.

Furthermore, the center point 12 of the circular top 11 is positioned directly vertically below the center of gravity 13 of upper portion 1. This alignment helps to keep upper portion 1 perfectly balanced atop lower portion 2.

Figure 6:
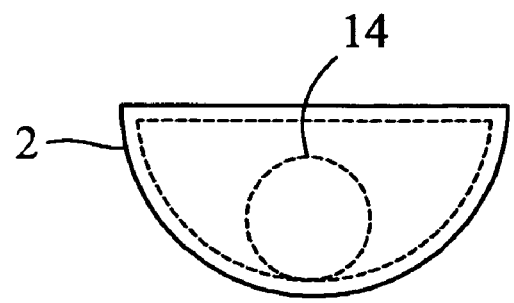
FIG. 6 is a side sectional view of the ballast-holding lower portion of the decoy while detached from the upper portion.
Figure 7:
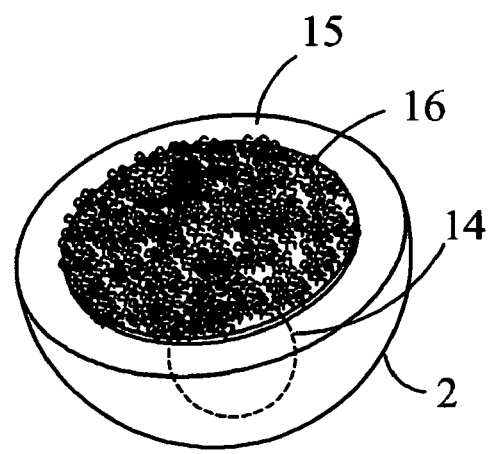
FIG. 7 is a top and side perspective view of the ballast-holding lower portion of the decoy while detached from the upper portion.
Figure 8:
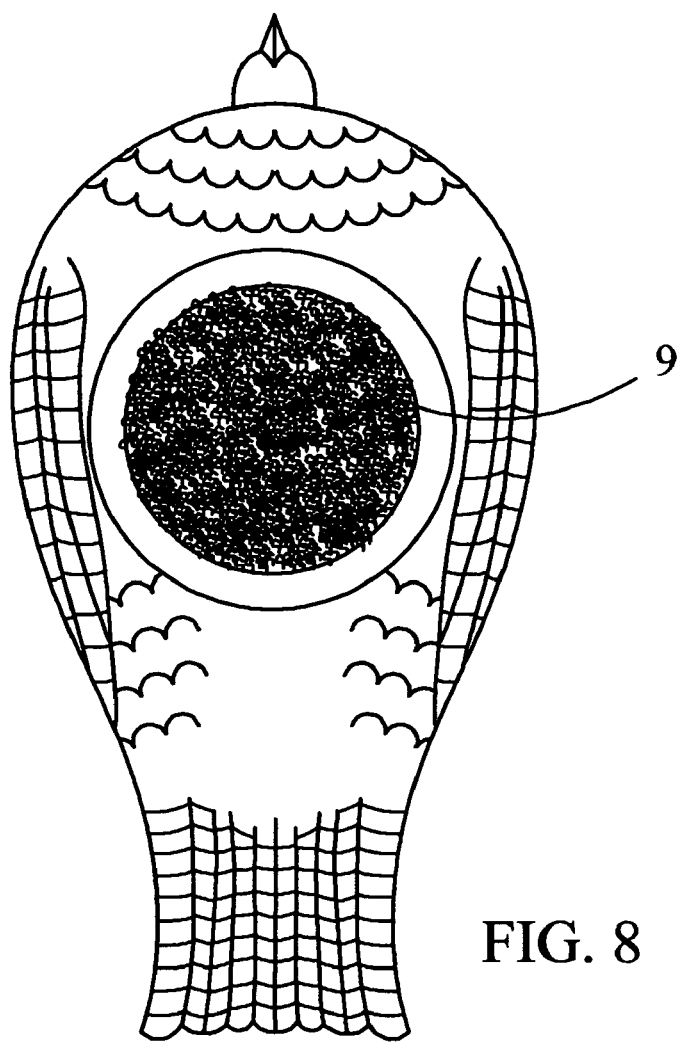
FIG. 8 is a bottom plan view of the upper portion of the decoy while detached from the lower portion.

Finally, a ballasting agent 14 is disposed within the lower portion 2. FIGS. 6 and 7 depict lower portion 2 as a stand-alone object, detached from upper portion 1. In that depiction of lower portion 2, ballasting agent 14 is a single, large, spherical, metal ball bearing. In other embodiments of the invention, ballasting agent 14 may comprise multiple smaller bearings, buckshot, liquid fluid or granular fluid—all of which freely flow within lower portion 2.

Nevertheless, in all embodiments of the present invention, the aggregate weight of lower portion 2 and ballasting agent 14 is significantly greater than the weight of upper portion 1. Consequently, when the decoy is laid or even thrown to a substantially flat ground surface, gravitational force invariably causes ballasting agent 14 to flow towards the bottom of lower portion 2. That phenomenon combined with the fact that the aggregate weight of lower portion 2 and ballasting agent 14 is substantially greater than the weight of upper portion 1, in turn, causes the decoy to assume an attitude whereby the bottom of lower portion 2 maintains contact with the ground surface and the decoy maintains an upright posture simulating that of a live prey animal. Furthermore, any moderate wind gusts would have the minimal effect of causing the decoy to simply rock and/or pivot about lower portion 2, further imitating live animal movement.

I claim:

1. A hunting decoy comprising:

an upper portion that is inflatable and collapsible and has a patch of hook and loop fastener material on a bottom surface thereof and which extends along the bottom surface, wherein the upper portion has the appearance of a game animal when said upper portion is fully inflated;

a substantially semispherical lower portion having a patch of hook and loop fastener material on a top surface thereof for engagement with the hook and loop fastener material on the upper portion and which extends along the top surface, the patch on the top surface engaging the patch on the bottom surface when the bottom and top surfaces are in facing relation such that the patch on the bottom surface extends parallel to the patch on the top surface during engagement, whereby the lower portion is removably attachable to the upper portion; and a ballasting agent disposed within the lower portion, wherein said ballasting agent is moveable within said lower portion relative to a ground surface upon which the decoy is rested, whereby the decoy is maintained in a freestanding, upright position relative to the ground surface upon which it is rested.

2. The hunting decoy as defined in claim 1, wherein the ballasting agent is comprised of at least one substantially spherical object.

3. The hunting decoy as defined in claim 1, wherein the ballasting agent is comprised of a fluid.

* * * * *